(12) United States Patent
Pintsov et al.

(10) Patent No.: US 6,904,419 B1
(45) Date of Patent: Jun. 7, 2005

(54) POSTAL COUNTER POSTAGE EVIDENCING SYSTEM WITH CLOSED LOOP VERIFICATION

(75) Inventors: Leon A. Pintsov, West Hartford, CT (US); Frederick W. Ryan, Jr., Oxford, CT (US)

(73) Assignee: Pitney Bowes Inc., Stamford, CT (US)

( * ) Notice: Subject to any disclaimer, the term of this patent is extended or adjusted under 35 U.S.C. 154(b) by 871 days.

(21) Appl. No.: 09/694,244

(22) Filed: Oct. 23, 2000

(51) Int. Cl.$^7$ ............................................. G07B 17/00
(52) U.S. Cl. ..................... 705/408; 705/30; 705/404
(58) Field of Search ...................... 705/30, 401, 404, 705/408

(56) References Cited

U.S. PATENT DOCUMENTS

| | | | |
|---|---|---|---|
| 4,802,218 A | * 1/1989 | Wright et al. .................. | 705/60 |
| 5,513,563 A | * 5/1996 | Berson ......................... | 101/91 |
| 5,781,438 A | 7/1998 | Lee et al. .............. | 364/464.14 |
| 5,809,485 A | 9/1998 | Arsenault et al. ........... | 705/410 |
| 5,812,991 A | 9/1998 | Kara ......................... | 705/410 |
| 6,039,257 A | * 3/2000 | Berson et al. .............. | 235/468 |
| 6,044,364 A | 3/2000 | DeFilippo et al. .......... | 705/404 |
| 6,085,182 A | * 7/2000 | Cordery ...................... | 705/408 |
| 6,308,165 B1 | * 10/2001 | Gilham ........................ | 705/62 |
| 6,424,954 B1 | 7/2002 | Leon .......................... | 705/401 |
| 2002/0046183 A1 | * 4/2002 | Gilham ........................ | 705/60 |

FOREIGN PATENT DOCUMENTS

| | | | |
|---|---|---|---|
| EP | 0493948 | * | 7/1992 |
| EP | 0 543 397 A2 | | 11/1992 |
| EP | 0862145 | * | 9/1998 |
| WO | WO 88/01818 | * | 3/1988 |

OTHER PUBLICATIONS

Whitehouse: "How Smaller Mailer Can Gain Automation Discounts"; Office Systems, Jan. 1992, vol. 9, No. 1, pp. 44–49.*

* cited by examiner

*Primary Examiner*—Edward R. Cosimano
(74) *Attorney, Agent, or Firm*—Angelo N. Chaclas; Steven J. Shapiro (57) ABSTRACT

A method for auditing postage dispensing transactions at a postal facility includes the steps of: receiving in a secure processor based device a request to dispense an amount of postage; updating, in response to the request, accounting data within the secure processor based device to account for the amount of postage; cryptographically securing the updated accounting data in the secure processor based device; dispensing the amount of postage by generating and applying the cryptographically, secured, updated accounting data to a mailpiece. The method further includes receiving cash value for the amount of postage dispensed; sending from the secure processor based device to an administrative computer a cryptographically secure message including the updated accounting data; obtaining and comparing, at the administrative computer, the updated accounting data from the secure message with the cash value received and previous updated accounting data received from a previous secure message from the secure processor based device, and determining if any inconsistencies exist based on the comparing; and obtaining and analyzing, at a funds management computer, the updated accounting data from the mailpiece and the updated accounting data from the secure message and determining if any inconsistencies exist based on the analyzing. An apparatus incorporates the method.

13 Claims, 6 Drawing Sheets

| ELEMENT | FUNCTION | ACCESS CONTROL | SMART CARD | ADMIN. SYSTEM | CA | VERIFICATION SYSTEM |
|---|---|---|---|---|---|---|
| $V_{CA}$ | SIGN CERTIFICATES | CA INTERNAL ONLY | | | X | |
| $U_{CA}$ | VERIFY MESSAGES SIGNED BY THE CA | CONTAINED IN $CA_{CERT}$ | | | X | |
| $CA_{cert}$ | ROOT CA CERTIFICATE | PUBLIC INFO | X | X | X | X |
| $V_{SC}$ | SIGN MESSAGES FROM A SMART CARD: AUDIT DPM NEW KEY REQUEST | SMART CARD INTERNAL ONLY | X | | | |
| $U_{SC}$ | VERIFY MESSAGES SIGNED BY A SMART CARD | AVAILABLE OUTSIDE SMART CARD UPON REQUEST | X | | | |
| $SC_{cert}$ | SMART CARD CERTIFICATE, PROVIDED TO ENABLE ADMINISTRATIVE SYSTEMS TO VERIFY MESSAGES SIGNED BY A PARTICULAR SMART CARD | AVAILABLE OUTSIDE SMART CARD UPON REQUEST | X | | X | X |
| $V_{SCnew}$ | NEW SMART CARD PRIVATE KEY (PENDING CERTIFICATE) | SMART CARD INTERNAL ONLY, THIS KEY CANNOT BE USED UNTIL A VALID CERTIFICATE IS RECEIVED | X | | | |
| $U_{SCnew}$ | NEW SMART CARD PUBLIC KEY (PENDING CERTIFICATE) | PROVIDED TO THE CA FOR CERTIFICATION | X | | X | |
| $V_{Admin}$ | SIGN MESSAGE FROM AN ADMINISTRATIVE SYSTEM: POSTAGE REFILL SMART CARD ENABLE/DISABLE NEW KEY REQUEST | ADMINISTRATIVE SYSTEM ONLY | | X | | |
| $U_{Admin}$ | VERIFY MESSAGES SIGNED BY AN ADMINISTRATIVE SYSTEM | AVAILABLE OUTSIDE ADMINISTRATIVE SYSTEM UPON REQUEST | | X | X | |
| $Admin_{cert}$ | ADMINISTRATIVE SYSTEM CERTIFICATE, PROVIDED TO ENABLE SMART CARDS TO VERIFY MESSAGES SIGNED BY A PARTICULAR ADMINISTRATIVE SYSTEM | AVAILABLE OUTSIDE THE ADMINISTRATIVE SYSTEM UPON REQUEST | | X | X | |

POSTAL COUNTER POSTAGE EVIDENCING SYSTEM WITH CLOSED LOOP VERIFICATION

FIELD OF THE INVENTION

The instant invention relates to a method and apparatus for securely producing evidence of postage dispensed. More particularly, the instant invention is directed to a closed loop verification system of audit and control which enables the detection of fraud at postal facility counters and the collection of evidence to support a charge of such fraud against particular individual(s).

BACKGROUND OF THE INVENTION

In many countries there are post offices, under the physical control of a postal authority, where letters and packages can be mailed. An individual can walk into the post office and present their mailpiece to a postal clerk at the postal counter. The clerk will weigh the mailpiece to determine the appropriate postage required, collect the value from the individual (i.e. cash, credit card, etc.) to pay for the required postage, and print out and attach to the mailpiece evidence of postage paid.

Figure 1:
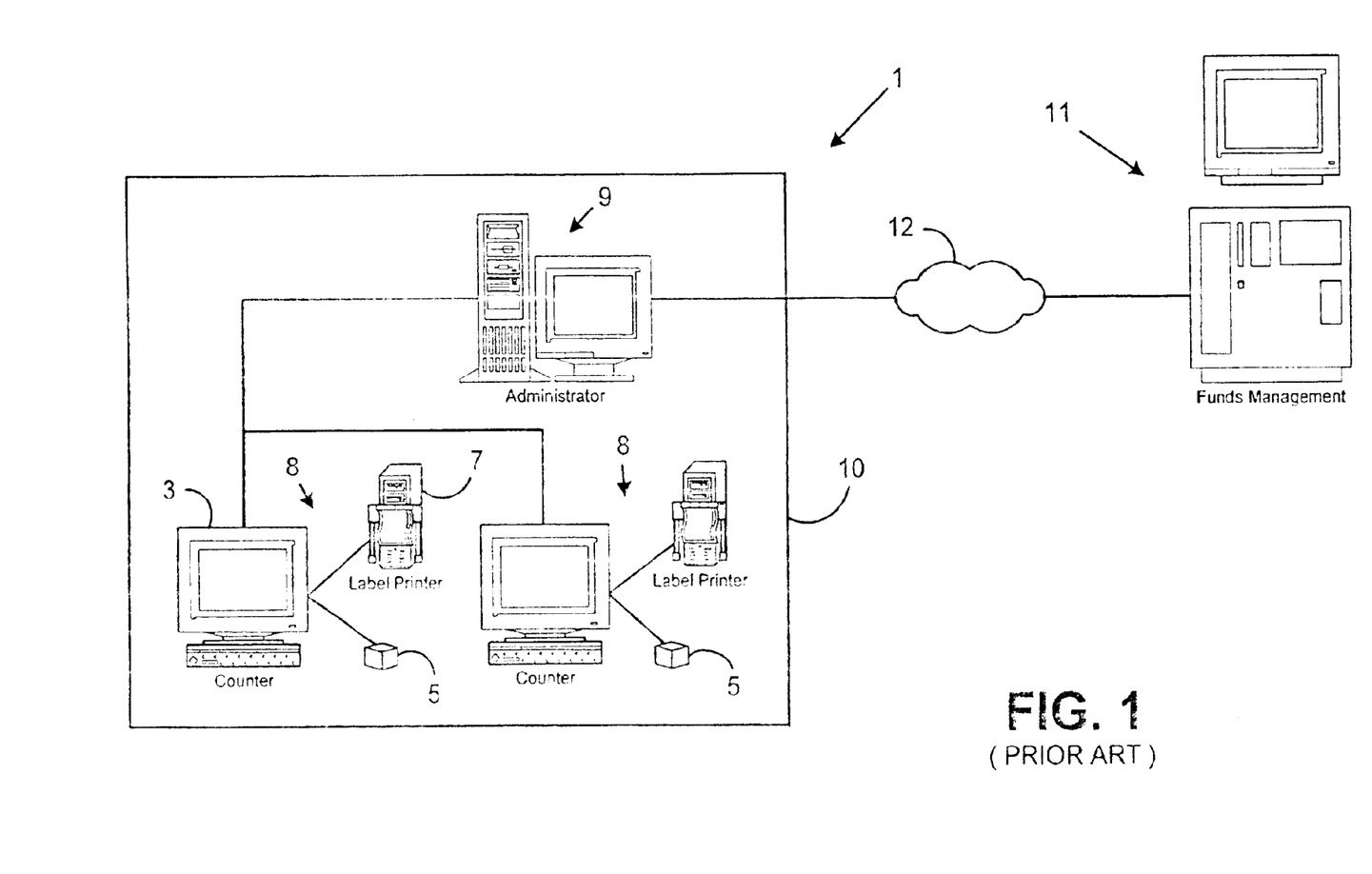
FIG. 1 shows a prior art postal counter audit system.

FIG. 1 shows a traditional postal counter audit system 1 that is used to implement the procedure described above. The postal counter audit system 1 includes a personal computer (PC) 3, a scale 5, and a label printer 7 (which collectively form a postal counter system 8). The postal counter system 8 prints evidence of postage dispensed at the direction of the postal clerks. Each postal counter system 8 maintains a logfile in the PC 3 of all postage that it dispenses. The logfile data should match the value collected by the postal clerks for the postage dispensed.

As further shown in FIG. 1, several postal counter systems 8 are commonly networked together along with an administrative computer 9 at a postal facility 10. The administrative computer 9 is controlled by a postal administrator responsible for the proper operation of the postal facility 10, e.g., a local postmaster. The postal administrator collects the logfile from each postal counter system 8 (electronically via the administrative computer 9). These logfiles are compared with the cash receipts (cash, credit card transactions, etc.) collected at each postal counter system 8. Any discrepancies between the cash receipts and the logfiles are an indicator of potential fraud by a postal clerk. Additionally, all logfiles, or at least a summary of logfile data from the postal facility 10, and a summary of cash receipt data are transmitted (over existing communication networks 12) to a postal funds management computer 11. The postal funds management computer 11 also compares the received logfile data with the cash receipt data to determine if any discrepancies exist which would be evidence of potential fraud.

Unfortunately, existing postal counter audit systems 1 are subject to several types of fraud which may go undetected. Since the PC 3 includes a processor which is not a secure device, the logfiles stored in PC 3 may be easily tampered with by postal clerks that have access to PC 3 and some basic computer knowledge. As a result, a clerk could simply modify the logfiles (perhaps by deleting entries) and pocket the funds from the cash drawer associated with the modified records. Since the tampered logfiles would match the cash receipts, it would be difficult for a postal administrator to determine that a clerk was stealing postal funds. Moreover, an administrator (working on his own or in conjunction with a clerk) could also falsify records (logfile summaries and cash receipts) prior to transmission to the postal funds management computer 11 and such fraudulent activity might go undetected.

The above potential fraudulent activities are largely attributable to the fact that there is no prepayment of postage at a postal counter system 8 as there is with a conventional prepayment postage meter. That is, in a postage meter since the value contained therein has already been paid for, the problems associated with a cash basis transaction for postage does not exist. Accordingly, the instant invention is directed toward the detection of fraud in a "pay for postage as you dispense" counter operation and the collection of collaborating evidence in support of such fraud detection.

Additionally, the postal counter audit system 1 does not have a source of data, separate from the data transmitted from the administrative computer 9 (or the postal counter system 8) to the funds management computer 11, that can be used to independently verify the data transmitted from the administrative computer 9. For example, if the logfiles are altered as discussed above, there is no data feedback based on the processing of the actual mailpieces passing through the mailstream that is used to detect such fraud.

Yet another problem occurs when several people operate a single postal counter system 8. In this situation, even if fraud is detected, it may be difficult to identify only those individuals committing the fraud.

Finally, another potential problem may exist if a postal clerk delays the reporting of logfiles. That is, if a postal clerk lags behind in sending out up to date logfiles, some of the cash received could be pocketed. In this situation the cash sent to the administrator would still match the transmitted logfiles which lag behind.

SUMMARY OF THE INVENTION

A method for auditing postage dispensing transactions at a postal facility includes the steps of: receiving in a secure processor based device a request to dispense an amount of postage; updating, in response to the request, accounting data within the secure processor based device to account for the amount of postage; cryptographically securing the updated accounting data in the secure processor based device; dispensing the amount of postage by generating and applying the cryptographically, secured, updated accounting data to a mailpiece. The method further includes receiving cash value for the amount of postage dispensed; sending from the secure processor based device to an administrative computer a cryptographically secure message including the updated accounting data; obtaining and comparing, at the administrative computer, the updated accounting data from the secure message with the cash value received and previous updated accounting data received from a previous secure message from the secure processor based device, and determining if any inconsistencies exist based on the comparing; and obtaining and analyzing, at a funds management computer, the updated accounting data from the mailpiece and the updated accounting data from the secure message and determining if any inconsistencies exist based on the analyzing. An apparatus incorporates the method.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

Figure 2:
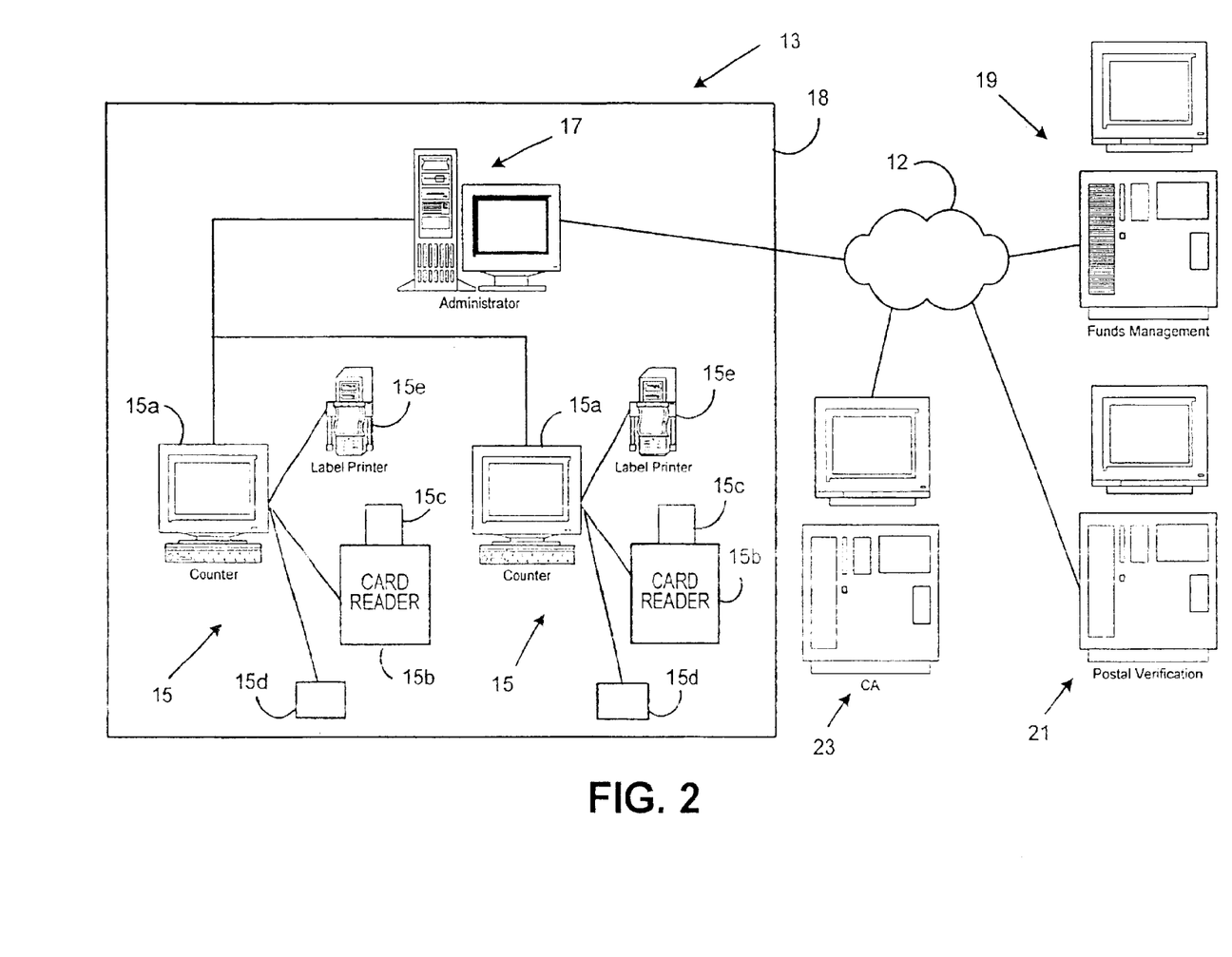
FIG. 2 shows the inventive postal counter audit and control system.

The inventive postal counter audit and control system (PCACS) 13, as shown in FIG. 2, employs a combination of smart card technology, public key cryptography, administrative audit and control, and physical security to manage the security of postage value dispensed by postal clerks at a postal counter. The PCACS 13 includes individual postage dispensing counters 15, an administrative computer 17, a funds management computer 19, a postal verification system (s) 21 and a certificate authority (CA) computer 23.

The postage dispensing counters 15 each include a PC 15a, a smart card reader 15b, a smart card 15c, a scale 15d and a label/mailpiece printer 15e. The purpose of the postage dispensing counters 15 are to provide a postal clerk the ability to create digital postage marks (DPM's 31) as evidence of postage dispensed by the postage dispensing counter 15. That is, unlike existing postal counter systems 1 (FIG. 1) that only print non-cryptographically secure evidence of postage dispensed, the postage dispensing counters 15 print cryptographically secure and verifiable DPMs 31.

Figure 3:
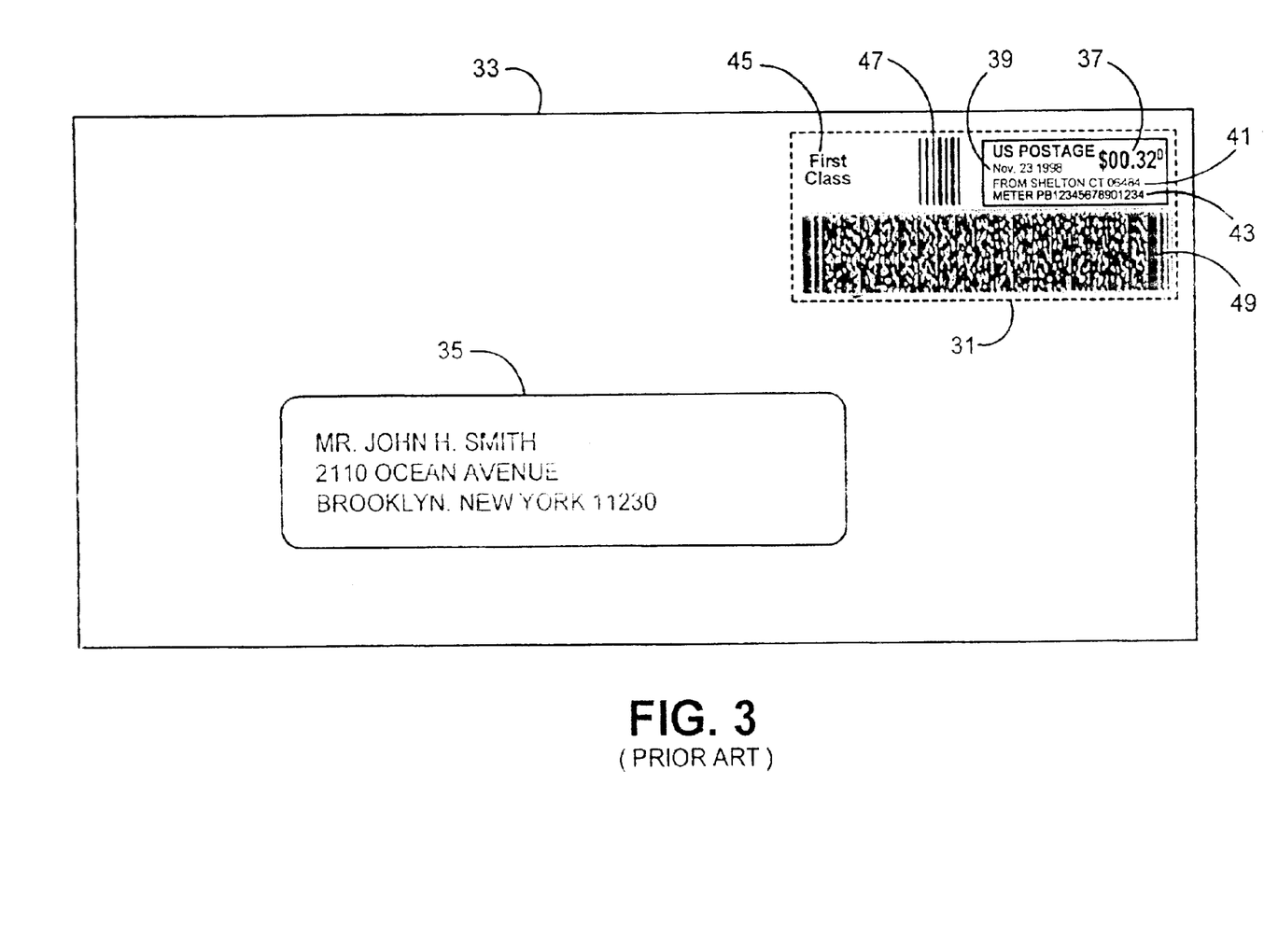
FIG. 3 shows a representative example of a digital postage mark.

Referring to FIG. 3, a representative DPM 31 is shown on a sealed mailpiece or sealed package 33 containing thereon a recipient address field 35. The DPM 31 contains a dollar amount 37, a date 39 that the evidence of postage was affixed to the mailpiece 33, a location 41 that the mailpiece 33 was mailed from, a meter serial number 43, the class of mail 45, a FIM code 47 and a 2D bar code 49. Bar code 49 includes cryptographically secured information that is derived from address field 35 and other information (such as the date 39, serial number 43, value of postage dispensed 37, piece count, descending and ascending register values) generated or contained in the meter that affixed DPM 31 to the mailpiece 33.

The cryptographically secured information contained in the bar code 49 may include all or only some of the data elements discussed above. However, whichever data is included it is digitally signed with the private key of the meter. Upon receipt of the mailpiece 33, the cognizant postal authority can obtain the public key that corresponds to the meter private key in order to verify the authenticity of the cryptographically secured information and the DPM 31.

Returning to FIG. 2, the PC 15a provides both the postal clerk interface and the communication interface between the smart cards 15c and the administrative computer 17. The smart cards 15c provide a secure, cost-effective mechanism to distribute the ability to create DPMs 31 to postage dispensing counters 15 and to individual postal clerks. That is, each postal clerk can be assigned a specific (uniquely identifiable such as through a unique serial no.) smart card 15c that provides the postal clerk with the ability to access the postal dispensing counters 15 via the card reader 15b and the PC 15a to create a DPM 31. The smart card 15c maintains a log of the postage dispensed from that smart card 15c which log should be consistent with the cash received at the postage dispensing counters 15. The DPM 31 is formatted for printing by the PC 15a and printed on a mailpiece or label by the printer 15d (preferably in machine-readable format such as the 2D barcode 49). As previously mentioned, each DPM 31 contains a digitally signed record (secret or public key infrastructures can be used) that indicates the smart card 15c that produced the DPM 31 and the postage amount dispensed. In a preferred embodiment, the DPM 31 also contains the date and an indication of register values of the smart card 15c.

The use of a smart card or a similar portable processing device in conjunction with a PC to create a verifiable DPM 31 as evidence of postage dispensed and to securely account for postage in the smart card is well known in the art as reflected in U.S. Pat. No. 5,781,438 which is hereby incorporated by reference. Accordingly, while a detailed description of such devices is not considered necessary for an understanding of the instant invention, a brief overview is considered helpful.

The smart card 15c accounts for all of the evidence of postage value dispensed from it in an ascending register. Additionally, the amount of evidence of postage value at any given time that is permitted to be dispensed is reflected in the descending register. The sum of the ascending and descending registers is known as the control sum and will always reflect the total of authorized postage value that has been made available to the meter over its lifetime. Moreover, these registers together with the smart card's 15c dedicated processor are all protected from a security attack by both physical and logical measures. Accordingly, the ability of an attacker to alter the accounting registers within the smart card 15c is significantly reduced as compared to modifying the logfiles of the prior art postal counter systems 8 (FIG. 1).

Referring to FIGS. 2–6, the operation of the PCACS 13 will now be described. When the smart card 15c is in the reader 15b and a postal clerk requests postage to be dispensed via the PC 15a, the smart card 15c accounts for the postage to be dispensed by adjusting the ascending and descending registers. Then, the smart card 15c signs the ascending and descending register data together with the smart card 15c serial number utilizing a private key $V_{SC}$ stored therein. The signed data is transmitted to the PC 15a which forms the final DPM 31 image that includes the signed data. The PC 15a then drives the printer 15e to print the DPM 31 on a label or the mailpiece. Once the mailpiece is placed into the mailstream, the DPM 31 can be scanned and read at the verification system 21 for verification (in a known manner) and subsequent use in detecting fraudulent activity as discussed in more detail below.

In addition to the above, the PC 15a may also store transaction logfiles which account for every postage dispensing transaction that takes place. Since the data in the logfiles consists of data signed by the smart card 15c, any modification of logfiles data can be detected. These logfiles therefore can be used as yet another source of data by the administrative computer 17 and/or the funds management computer 19 to help detect fraudulent activity.

The administrative computer 17 provides a central point of local audit and control over the postage dispensing counters 15 at each postal facility 18. In addition, the administrative computer 17 provides a communication interface between postage dispensing counters 15 and the certificate authority computer 23, the postal verification computer 21 and the funds management computer 19. Each administrative computer 17 is capable of auditing the functions of each smart card 15c, collecting data from each smart card 15c and its associated PC 15a, enabling and disabling each smart card 15c, and controlling the amount of postage each smart card 15c is able to dispense. Therefore, the administrative computer 17 provides the postal authority with local control of the individual postage dispensing counters 15 within the postal facility 18.

Figure 4:
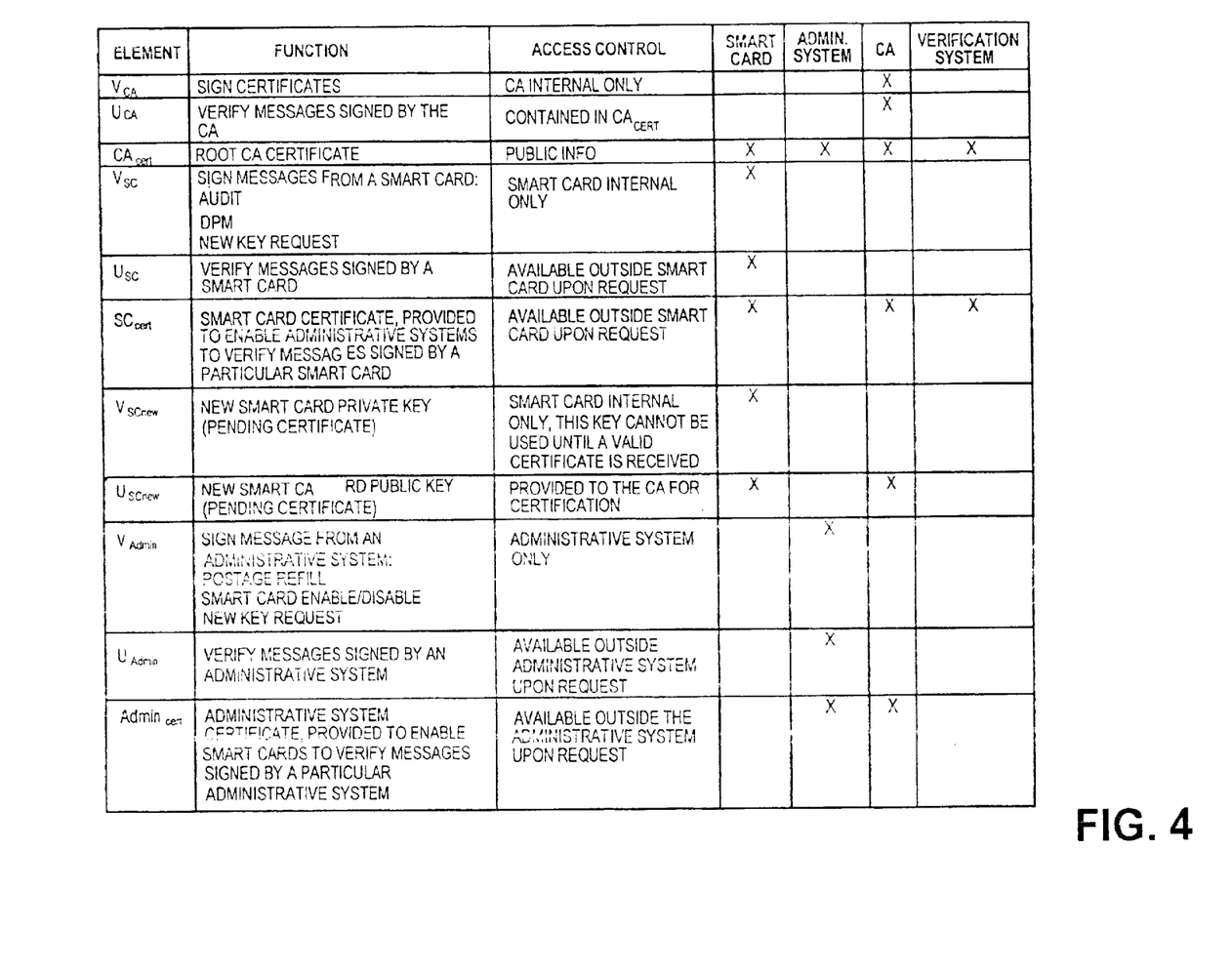
FIG. 4 describes the cryptographic elements used in the inventive a system of FIG. 2.

The certificate authority computer 23 is responsible for certifying the "identity" of the administrative computer 17 and the smart cards 15c. Each administrative computer 17 contains a unique private key $V_{Admin}$ which is used to sign messages that enable, disable, or add funds to smart cards 15c. Each smart card's 15c unique private key $V_{SC}$ is used to sign messages from the smart card 15c. The certificate authority computer 23 provides a certificate to each smart card 15c and each administrative computer 17. Each certificate (Admin$_{cert}$, SC$_{cert}$) is the respective public key ($U_{Admin}$, $U_{SC}$) of the administrative computer 17 and the smart card 15c, as the, case may be, signed with the private key $V_{CA}$ of the certificate authority.

Figure 5:
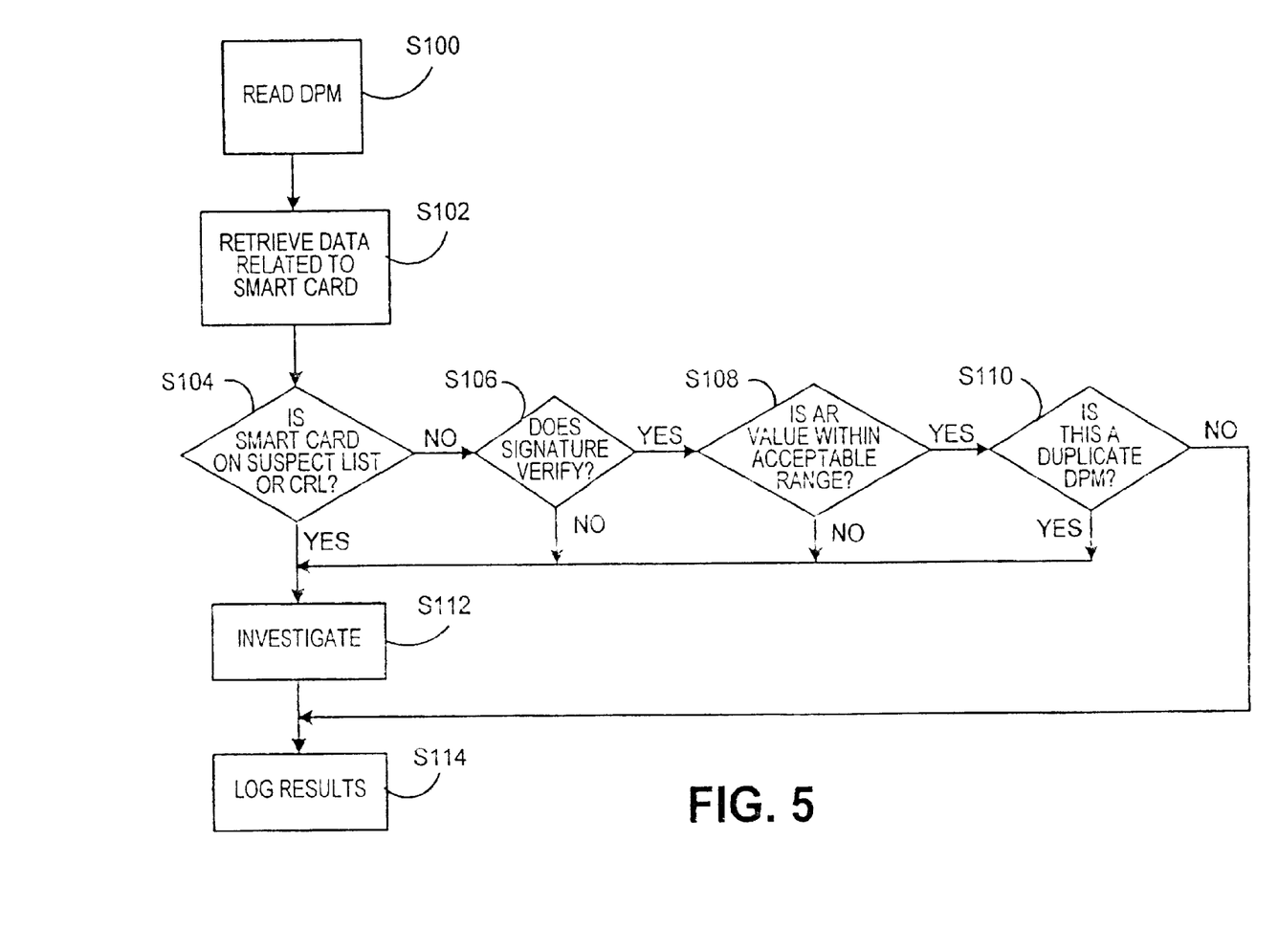
FIG. 5 shows a verification procedure.

The postal verification system's 21 computer checks the validity of DPMs 31, maintains a log of mail processed based on the scanned DPM's 31, and transmits the data retrieved from the scanned DPMs 31 to the funds management computer 19. The verification system 21 stores a copy of each smart card's 15c certificate SC$_{cert}$ in order to verify DPMs 31 (alternatively the SC$_{cert}$ can be included as part of the DPM 31). That is, in one embodiment, the DPM 31 includes a unique identifier that identifies the smart card 15c that produced the DPM 31, the amount of postage dispensed and associated with the particular DPM 31, and at least the ascending register value (and preferably the descending register value as well) of the smart card 15c, all of which is signed using the private key $V_{SC}$ of the smart card 15c. As shown in FIG. 5, the verification computer 21 receives the cryptographically secure DPM 31 data which has been scanned off the mailpiece during the processing of the mailpiece in the mailstream (step S100) and obtains the smart card 15c data (register readings, postage amount, date postage dispensed, smart card identification) contained therein (step S102). The verification computer 21 then determines whether the specific smart card 15c has been flagged as being on a suspect list and whether it appears on a certificate revocation list (CRL) (step S104). The suspect list identifies smart cards 15c that have been designated as having been potentially used in a fraudulent manner while the CRL identifies smart cards 15c having an expired certificate SC$_{cert}$. If the particular smart card 15c appears on the suspect list or the CRL, an investigation is initiated (step 112). Assuming the particular smart card 15c does not appear on the suspect list or the CRL, the verification computer 21 uses a certificate authority root certificate CA$_{cert}$ to obtain the public key $U_{CA}$ of the certificate authority. The public key $U_{CA}$ of the certificate authority is then used to obtain the public key of the smart card 15c from the smart card 15c certificate SC$_{cert}$ so that the DPM 31 can be verified in a known manner (step S106). If verification is not successful, an investigation is initiated at step S112. If verification is successful, the verified data is sent to the funds management computer 19 where it is used as data independent from data received from either the administrative computer 17, the PC 15a or the smart cards 15c. Accordingly, any inconsistencies detected between register, postage amount or date data obtained from the mailpiece and similar data received from the administrative computer 17, PC 15a or the smart cards 15c provides an indication of potential fraudulent activity and ensures the robustness of the inventive PCACS 13 as compared to the prior art system 1. For example, if the funds management computer 19 identifies an inconsistency in ascending register data (step S108) it starts an investigation (step S112). On the other hand, if the ascending register check is valid, the funds management computer 19 determines if this particular DPM 31 is redundant with that of a previously processed mailpiece 33 (step 110). If it is, an investigation is started (step S112), however if it isn't, the funds management computer 19 just logs in the results of all of the checks at step S114.

Figure 6:
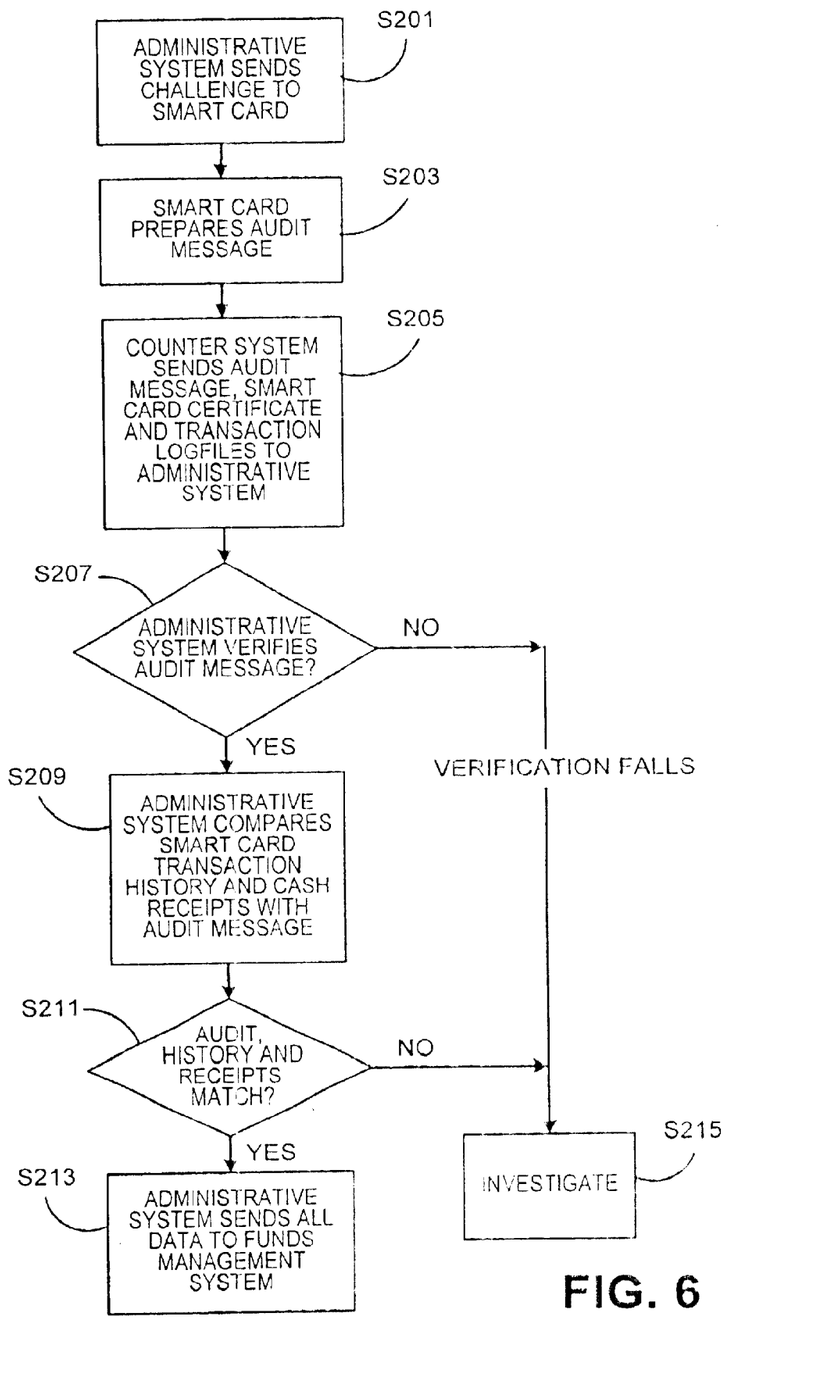
FIG. 6 shows an audit procedure implemented in the invention of FIG. 2.

Referring to the flowchart of FIG. 6, the flow of data between the smart card 15c, administrative computer 17, and funds management computer 19 will be discussed. The administrative computer 17 issues a challenge to a smart card 15c (step S201). The smart card 15c prepares an audit message in response to the challenge by signing its internal data (e.g., register values, status, failure counts, identifier) and the challenge using $V_{SC}$ (step S203). The audit message, transaction logfiles from PC 15a and SC$_{cert}$ are then sent, via the PC 15a, to the administrative computer 17 (step S205). The administrative computer 17 then verifies the audit message (step S207). If verification is successful, the administrative computer 17 compares the internal data with previous internal data received from the smart card 15c, the transaction logfiles, any funds transfer operations previously performed by that administrative computer 17 with respect to the particular smart card 15c, and cash data (step S209). In the event that all of the compared data is consistent (step S211), the administrative computer 17 forwards the audit message, logfiles, and cash receipt data to the funds management computer 19 where similar consistency checks are performed (step S213). On the other hand, if an inconsistency is found at step S211 or verification fails at step S207, an investigation as to whether fraudulent activity has occurred is initiated at step S115.

In another embodiment, the funds management computer 19 also has the option of providing the challenge to the smart card 15c (via the administrative computer 17). This allows tampering with the administrative computer 17 to be detected (e.g., an administrator who collected a number of audit messages from a smart card 15c over the course of a day and sent them to the funds management computer 19 over a number of days to cover up that he was pocketing some of the cash received at the postal facility).

As previously discussed, each smart card 15c has a descending register having a value that limits the amount of evidence of postage that can be dispensed from the smart card 15c. The administrative computer 17 is provided with the capability to authorize an increase in the value stored in the descending register. The administrative computer 17, under control of an administrator, signs a message (including a transaction number to avoid replay attacks) using $V_{Admin}$ indicating an amount of value to be added to the descending register of a particular smart card 15c. The signed message is sent together with the Admin$_{Cert}$ to the smart card 15c which verifies the command using Admin$_{Cert}$. Upon successful verification of the message, the smart card 15c adds the amount of value to its existing balance in the descending register. The postage refill process described above should be preceded and followed by an audit of the smart card 15c register values. It should also be noted that in some systems there is not a requirement for a descending register value such that no limit is imposed on the amount of evidence of postage that can be dispensed.

Local control of the smart cards 15c by the administrative computer 17 is further provided by the administrative computer's 17 ability to enable and/or disable individual smart cards 15c. That is, if a particular smart card 15c is designated as requiring activation (enable) or deactivation (disable) the administrative computer 17 signs a message (including a transaction number to avoid replay attacks) using $V_{Admin}$ indicating that a particular smart card 15c should be enabled or disabled. The smart card 15c verifies the message, using $Admin_{Cert}$ that has been provided by the administrative computer 17. Upon successful verification, the smart card 15c either enables or disables itself. The smart card 15c enable/disable process should be preceded and followed by an audit of the smart card 15c registers. The result of all smart card 15c enable/disable attempts (including smart card register values) is sent by the administrative computer to the funds management computer 19. U.S. Pat. No. 5,809,485 describes a system for disabling a smart card in a postage meter and is hereby incorporated by reference.

In order to increase the overall security of the PCACS 13, each of the smart cards 15c and administrative computer 17, on a periodic basis, must generate a new key pair (private and public key) and request a certificate from the CA computer 23. This is accomplished by executing the following steps:

A. The smart card 15c or administrative computer 17 generates a key pair ($V_{new}$ and $U_{new}$)

B. The smart card 15c or administrative computer 17 signs the new public key, $U_{new}$, with the new private key, $V_{new}$ (this ensures that the smart card 15c or administrative computer 17 knows the private key that corresponds to the public key C. The smart card 15c or administrative computer 17 incorporates the result in a certificate request signed with the smart card 15c or administrative computer 17 existing private key, $V_{existing}$ D. The smart card 15c or administrative computer 17 sends the certificate request and the smart card's 15c or administrative computer's 17 existing certificate to the CA (Due to a potential delay between a new certificate request actually receiving the certificate, smart cards 15c store both the old and new key pairs in nonvolatile memory until a valid certificate for the new key has been received)

E. The CA computer 23 verifies the request and signs a new certificate for the smart card 15c or administrative computer 17

F. The CA computer 23 sends the certificate to the smart card 15c or administrative computer 17

G. The smart card 15c or administrative computer 17 verifies the certificate and then begins using the new key pair and its associated certificate.

The PCACS 13 as described above provides improved fraud detection capabilities as compared to the prior art postal counter solutions. For example, if a smart card 15c is reported as lost, stolen, or as having produced DPM's 31 with inconsistent data from that scanned off the mailpiece, it can be placed on the suspect list. Subsequent mailpieces having DPMs 31 produced by that smart card 15c will be detected during the verification process as being on the suspect list. This allows the mail operator to suspend delivery of such mailpieces pending an investigation.

Additional advantages and modifications will readily occur to those skilled in the art. Therefore, the invention in its broader aspects is not limited to the specific details and representative devices, shown and described herein. Accordingly, various modifications may be made without departing from the spirit or scope of the general inventive concept as defined by the appended claims. For example, while the preferred embodiment shows an open metering system that uses a smart card 15c, a PC 15a, and a printer 15e, a closed system metering device could be used as well. The closed metering device produces a DPM 31 as evidence of postage but typically includes in a single secure housing a processor, the accounting registers, and a dedicated printer as is known in the art. Furthermore, in another embodiment local control of the postage dispensing counters 15 can be relinquished by eliminating the administrative computer 17 and putting all of its functionality at the funds management computer 19. Finally, smart cards 15c can be designed to be operative only with a single administrative computer 17 to preclude the use of different smart cards 15c at multiple postal facilities 18.

What is claimed is:

1. A method for auditing postage dispensing transactions at a postal facility, the method comprising the steps of:

receiving in a secure processor based device a request to dispense an amount of postage;

updating, in response to the request, accounting data within the secure processor based device to account for the amount of postage;

cryptographically securing the updated accounting data in the secure processor based device;

dispensing the amount of postage by generating and applying the cryptographically, secured, updated accounting data to a mailpiece;

receiving cash value for the amount of postage dispensed;

sending from the secure processor based device to an administrative computer a cryptographically secure message including the updated accounting data;

obtaining and comparing, at the administrative computer, the updated accounting data from the secure message with the cash value received and previous updated accounting data received from a previous secure message from the secure processor based device, and determining if any inconsistencies exist based on the comparing; and obtaining and analyzing, at a funds management computer, the updated accounting data from the mailpiece and the updated accounting data from the secure message and determining if any inconsistencies exist based on the analyzing.

2. A method as recited in claim 1, wherein the cryptographically, secured, updated accounting data and the secure message are created based on a public key infrastructure.

3. A method as recited in claim 1, wherein the secure processor based device is a smart card.

4. A method as recited in claim 3, further comprising storing the accounting data in an ascending register in the secure processor based device.

5. A method as recited in claim 3, further comprising storing the accounting data in ascending and descending registers in the secure processor based device.

6. A method for auditing value dispensing transactions, the method comprising the steps of:

updating accounting data within a secure processor based device to account for an amount of value to be dispensed by the secure processor based device;

cryptographically securing the updated accounting data in the secure processor based device;

dispensing the amount of value by generating and applying the cryptographically, secured, updated accounting data to an item;

receiving cash value for the amount of value dispensed;

sending from the secure processor based device to an administrative computer a cryptographically secure message including the updated accounting data;

obtaining and comparing, at the administrative computer, the updated accounting data from the secure message with the cash value received and previous updated accounting data received from a previous secure message from the secure processor based device, and determining if any inconsistencies exist based on the comparing; and obtaining and analyzing, at a funds management computer, the updated accounting data from the item and the updated accounting data from the secure message and determining if any inconsistencies exist based on the analyzing.

7. A method as recited in claim 6, wherein the cryptographically, secured, updated accounting data and the secure message are created based on a public key infrastructure.

8. A method as recited in claim 6, wherein the secure processor based device is a smart card.

9. A method as recited in claim 8, further comprising storing the accounting data in an ascending register in the secure processor based device.

10. A method as recited in claim 8, further comprising storing the accounting data in ascending and descending registers in the secure processor based device.

11. A system for auditing postage dispensing transactions comprising:

a postal facility including
   a secure processor-based device that dispenses postage as a DPM, the secure processor-based device including memory that stores accounting data representative of the postage dispensed, means for cryptographically securing the accounting data, and means for generating a secure message including the cryptographically secured accounting data;
   a printer, operatively connected to the secure processor-based device, that receives the cryptographically secured accounting data from the secure processor-based device and prints the DPM on a mailpiece, the DPM including the cryptographically secure accounting data;
   an administrative computer that receives the secure message from the secure processor-based device, compares the accounting data contained in the secure message with cash receipts received at the postal facility and accounting data previously obtained from the secure processor-based device, and determines if any inconsistencies exist; and a postal verification system that obtains the DPM from the mailpiece, verifies the authenticity of the DPM, and obtains the accounting data contained in the DPM;

a funds management computer that compares the accounting data contained in the DPM that is received from the postal verification system, the accounting data contained in the secure message that is from the administrative computer, and the cash receipts to determine if any inconsistencies exist.

12. A method for auditing value dispensing transactions, the method comprising the steps of:

updating accounting data within a secure processor based device to account for an amount of value to be dispensed by the secure processor based device;

cryptographically securing the updated accounting data in the secure processor based device;

dispensing the amount of value by generating and applying the cryptographically, secured, updated accounting data to an item;

receiving cash value for the amount of value dispensed;

sending from the secure processor based device to a computer a cryptographically secure message including the updated accounting data;

obtaining and comparing, at the computer, the updated accounting data from the secure message with the cash value received and previous updated accounting data received from a previous secure message from the secure processor based device, and determining if any inconsistencies exist based on the comparing; and obtaining and analyzing, at the computer, the updated accounting data from the item and the updated accounting data from the secure message and determining if any inconsistencies exist based on the analyzing.

13. A method for auditing postage dispensing transactions at a postal facility, the method comprising the steps of:

receiving in a secure processor based device a request to dispense an amount of postage;

in response to the request, one of accounting and piece count data within the secure processor based device to account for the postage transaction;

cryptographically securing the updated one of accounting and piece count data in the secure processor based device;

dispensing the amount of postage by generating and applying the cryptographically, secured, updated one of accounting and piece count data to a mailpiece together with the amount of postage;

receiving cash value for the amount of postage dispensed;

sending from the secure processor based device to an administrative computer a cryptographically secure message including the updated one of accounting and piece count data;

obtaining and comparing, at the administrative computer, the updated one of accounting and piece count data from the secure message with the cash value received and previous updated one of accounting and piece count data received from a previous secure message from the secure processor based device, and determining if any inconsistencies exist based on the comparing; and obtaining and analyzing, at a funds management computer, the updated one of accounting and piece count data from the mailpiece and the updated one of accounting and piece count data from the secure message and determining if any inconsistencies exist based on the analyzing.

* * * * *